United States Patent [19]

Greer

[11] Patent Number: 5,259,614

[45] Date of Patent: Nov. 9, 1993

[54] COMPOSITE SEAMLESS FILAMENT-WOUND GOLF CLUB SHAFT AND METHOD

[76] Inventor: Julian A. Greer, 4001 Piedmont Dr. SE., Huntsville, Ala. 35802

[21] Appl. No.: 925,612

[22] Filed: Aug. 6, 1992

[51] Int. Cl.⁵ .................. A63B 53/04; A63B 53/12
[52] U.S. Cl. ................... 273/80 B; 273/80 A; 273/167 F; 273/DIG. 7; 273/DIG. 23; 73/579
[58] Field of Search ............... 273/80 R, 80 A, 80 B, 273/80 C, DIG. 7, DIG. 23, 67 R, 77 A, 77 R, 167-175; 73/65, 579

[56] References Cited

U.S. PATENT DOCUMENTS

| | | | |
|---|---|---|---|
| 2,573,361 | 10/1951 | Rodgers et al. | 273/DIG. 7 X |
| 2,809,144 | 10/1957 | Grimes | 273/80 B |
| 2,992,828 | 7/1961 | Stewart . | |
| 3,313,541 | 4/1967 | Benkoczy et al. | 273/80 R |
| 3,433,696 | 3/1969 | Michael | 273/80 R |
| 3,457,962 | 7/1969 | Shobert | 273/80 R X |
| 3,476,625 | 11/1969 | Slivinsky et al. . | |
| 3,544,421 | 12/1970 | Griffith | 273/80 R |
| 3,813,098 | 5/1974 | Fischer et al. | 273/DIG. 7 X |
| 4,070,022 | 1/1978 | Braly . | |
| 4,082,277 | 4/1978 | Van Auken et al. . | |
| 4,084,819 | 4/1978 | Van Auken . | |
| 4,122,593 | 10/1978 | Braly . | |
| 4,135,035 | 1/1979 | Branen et al. | 273/80 B X |
| 4,455,022 | 6/1984 | Wright . | |
| 4,506,887 | 3/1985 | Trysinsky . | |
| 4,563,007 | 1/1986 | Bayliss et al. . | |
| 4,591,157 | 5/1986 | Parente et al. . | |
| 4,889,575 | 12/1989 | Roy . | |
| 4,958,834 | 9/1990 | Colbert . | |
| 5,028,464 | 7/1991 | Shigetoh . | |
| 5,071,687 | 12/1991 | Shigetoh | 273/80 R X |

OTHER PUBLICATIONS

Frank W. Thomas, Technical Director of the United States Golf Association, *Notice to Manufacturers of Golf Clubs and Golf Shafts* (Nov. 13, 1990) (2 pages).

Francis W. Sears, Mark W. Zemansky, and Hugh D. Young, *University Physics* (7th ed. 1987), pp. 182-196; pp. 250-252.

F. H. Agnew, *The American Golfer: Golf Clubs*—Their Balance and Effectiveness (1911).

Ovid W. Eshbach, Handbook of Engineering Fundamentals (1961) pp. 5-15, 5-34, 5-52 and 5-53.

Byron D. Tapley, *Eshbach's Handbook of Engineering Fundamentals*, 4th ed. 1990, pp. 3-35.

Robert K. Adair, Physics of Baseball (1990), p. 56.

*Technical Report: A Quatiative Comparison of Shaft Torque & Stiffness,* Golf Report (1990).

Advertisement bearing a 1990 copyright date and published in the Dec. 1991 issue of *Clubmaker's Digest.*

Primary Examiner—V. Millin
Assistant Examiner—Sebastiano Passaniti
Attorney, Agent, or Firm—Walker, McKenzie & Walker

[57] ABSTRACT

A composite seamless filament-wound golf club shaft and method of manufacture, in which the shaft includes a hollow steel tubular core and a filament such as steel, fiberglass, graphite, or carbon, spirally wound about the core to form a seamless jacket thereabout. The filament is impregnated with an adhesive and permanently bonded to the core, and the core may be torsionally stressed prior to and during the winding thereupon and bonding thereto of the filament. The shaft can be made as an overlong blank universal shaft, then portions of the butt and tip of the shaft can be trimmed to produce a desired shaft length and natural frequency of vibration. When attached to a club head, the head may be weighted to produce a resulting golf club of desired swing weight.

8 Claims, 1 Drawing Sheet

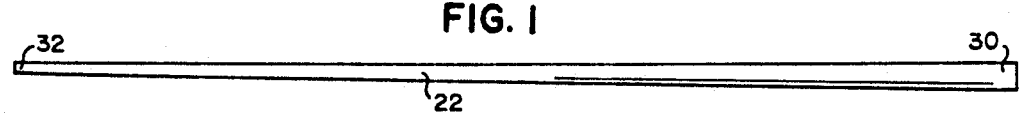
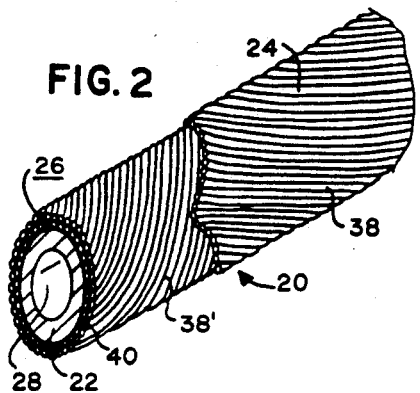
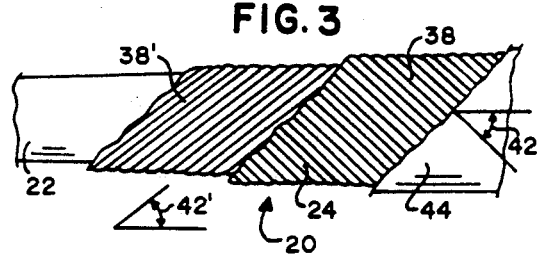
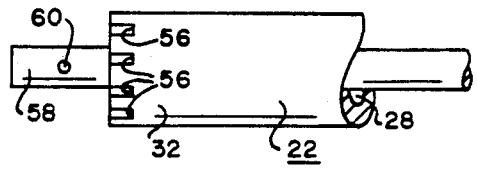
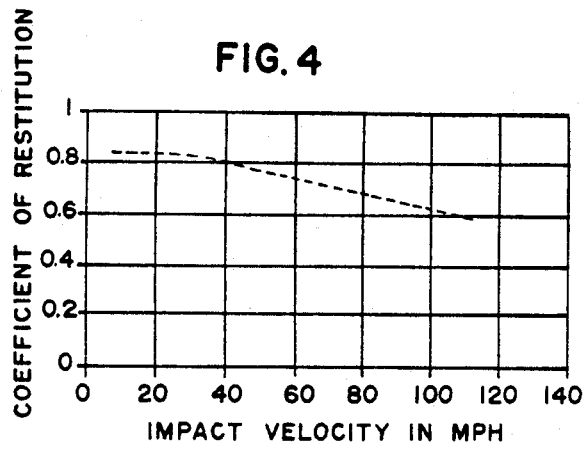
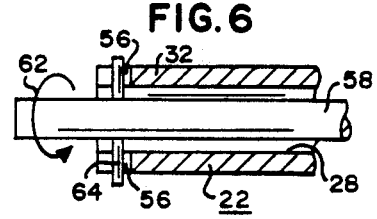
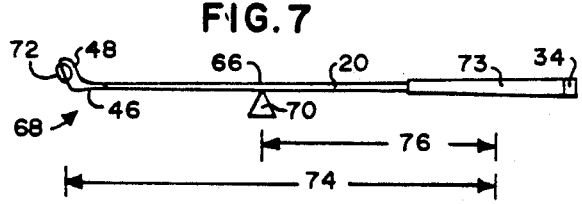
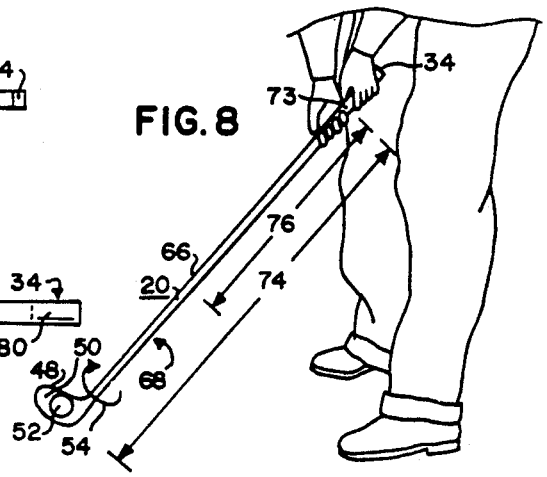
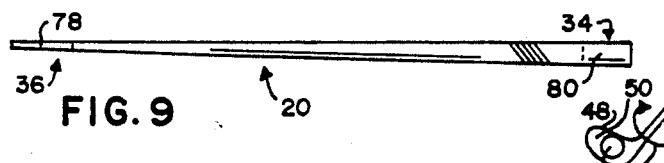

COMPOSITE SEAMLESS FILAMENT-WOUND GOLF CLUB SHAFT AND METHOD

BACKGROUND OF THE INVENTION

Field of the Invention

The present invention relates, in general, to an improved golf club, and in particular, to a golf club shaft and the method of making same.

Description of the Related Art

When a golf club strikes a stationary golf ball, many bending and twisting forces are exerted upon the golf club shaft by the ball at the moment of impact. Furthermore, golfers are quite sensitive to the subjective "feel" of a club as it strikes the ball, and a great amount of research has been conducted to develop high performance golf shafts having acceptable vibration, bending, and twisting characteristics. Well-known solutions for this problem include composite filament-wound graphite shafts in which a filament of graphite is wound on a tapered mandrel that is removed once the epoxy resin that impregnates the graphite fibers has cured, thereby producing hollow graphite shafts that are extremely resistant to bending and twisting as compared to the older steel shafts. Other shafts are known that are created from tubes of graphite with strengthening boron fibers laid longitudinally around a mandrel that is again removed after manufacture. Typically a release agent will be used to coat the mandrel used in the manufacture of both these types of shafts to ease the removal after the graphite jacket is formed and cured thereon. The increased stiffness of these high performance graphite shafts is due to the well-known inherent structural properties of a resin-epoxy-graphite compound. However, these newer graphite shafts are expensive because of the lightweight, high-strength materials used in their fabrication, as well as the programming required on computerized fabrication machinery used in their production, both as compared to traditional shafts.

It is well known that graphite shafts created from strips of graphite or boron fabric will have a preferred direction of bending due to the fabric seams which run longitudinally or spirally along the shaft, and some research has even discovered methods of determining a preferred orientation of the shaft so as to minimize the effects of the shaft's resulting directional bending preference. However, the United States Golf Association, in a recent notice, has pointed out that golf clubs having a shaft with an orientation preference violate the Association's rules regarding bending and twisting properties. Prank W. Thomas, Technical Director of the United States Golf Association, *Notice to Manufacturers of Golf Clubs and Golf Shafts* (Nov. 13, 1990).

Furthermore, any club shaft, particularly a steel shaft, has a "dead zone" through which the club must twist before the twisting forces acting upon the club as it contacts a golf ball become in equilibrium with the restoring forces of the club shaft.

It is therefore desirable to have a golf club shaft with increased stiffness over traditional golf club shafts that comprises a minimum amount of expensive graphite or boron fibers as compared to the amount heretofore required. Such a golf club shaft should also not have a preferred direction of orientation, and should have uniform and symmetric bending characteristics in each transverse direction. Furthermore, the golf club shaft should preferably provide means for reducing the "dead zone" through which the club shaft must twist as the club head contacts a golf ball before torsional forces become in equilibrium and exert a significant force against the golf ball.

SUMMARY OF THE INVENTION

The present invention is a composite seamless filament-wound golf club shaft. A metal core, preferably tubular, is spirally wound with a filament such as steel, fiberglass, graphite, or carbon, impregnated to form a seamless jacket thereabout, with the filament being permanently bonded, as with an adhesive, to the metal core. In the preferred embodiment, the metal cores of "stiff" and "extra stiff" flex shafts are prestressed with a specified torque prior to and during the winding thereupon and bonding thereto of the filament. The shaft of a finished club should bend uniformly in each direction regardless of how the shaft is rotated about its longitudinal axis.

The combination of a metal core bonded to a wound filament jacket provides a reduction in cost over prior art golf club shafts consisting only of expensive graphite or metallic fibers due to the minimum of epoxy-graphite or other fiber material required. Torsional prestressing of the metal core reduces the "dead zone" through which the club shaft must twist as the club head contacts a golf ball before torsional forces become in equilibrium and exert a significant force against the golf club head alignment.

BRIEF DESCRIPTION OF THE DRAWINGS

FIG. 1 is a view of the metal core upon which a filament is spirally wound.

FIG. 2 is a perspective partial sectional view of a portion of the completed golf club shaft showing one filament layer wound upon another.

FIG. 3 is a view of a portion of a completed golf club shaft with successive portions removed to show the construction thereof.

FIG. 4 is a graph showing the coefficient of restitution of a golf ball versus the impact velocity in miles per hour.

FIG. 5 is a view of an end of the metal core with a torsional appliance rod partially inserted therethrough.

FIG. 6 is a longitudinal sectional view of an end of the metal core with the torsional appliance rod secured to the core's end while applying a torsional stress thereto.

FIG. 7 is a diagram showing the location of the approximate center of gravity (forces) of the entire mass of the shaft with an attached club head.

FIG. 8 is a view of a golfer swinging the golf club, showing the torsional stresses acting upon the club shaft at the moment of impact and the location of the center of gravity (forces) of the entire mass.

FIG. 9 is a view of an elongated golf club shaft of the present invention having trimmable tip and butt portions allowing for alteration of the natural frequency of the golf club shaft.

DESCRIPTION OF THE PREFERRED EMBODIMENT

Referring to FIGS. 1-3 and 9, the improved golf club shaft 20 is seen to comprise a metal core 22 and a filament 24 spirally wound about core 22 to form a seamless jacket 26 thereabout. Metal core 22 is preferably a well-known blank steel undersized shaft such as the "medium bend point" shafts for "woods" (drivers) or "irons," manufactured by the True-Temper Sports Co., Suite 201, Ridgeway Loop Rd., Memphis, Tennessee. Core 22 preferably is formed as a hollow seamless steel tube having a longitudinal bore 28 therethrough for weight reduction as well as for reasons hereinafter described. The preferred cylinder wall thickness of core 22 is 0.015 inches. Typically and preferably core 22 may be tapered as shown from a larger butt end 30 to a smaller tip end 32, thereby producing a tapered shaft 20 having a larger butt end 34 and a smaller tip end 36. While a uniform taper of core 22 is preferred, it shall be understood that other, non-uniform, tapers may also be employed in a manner now apparent to those skilled in the art. Furthermore, the outer diameter of butt end 30 of core 22 should preferably be 0.560 inches, while tip end 32 should preferably be 0.310 inches for a well-known "metal-wood" (driver) shaft or 0.340 inches for an "iron" shaft.

Filament 24 is spirally wound about core 22 from one end thereof to the other in layers 38 and 38' in a manner well-known to those skilled in the art. Filament 24, preferably selected from the group consisting of steel, fiberglass, graphite, and carbon, materials chosen for their superior strength to weight ratio and flexibility characteristics, is impregnated with an adhesive 40, such as an epoxy resin adhesive well-known to those skilled in the art, and is permanently bonded to core 22 as by heating the wound shaft 20 in an oven at elevated temperatures, thereby curing adhesive 40. It should be emphasized that FIG. 3 shows the construction of shaft 20 with portions of layers 38 and 38' removed for purposes of illustrating the angled spiral winding of one layer 38 over another 38', each layer preferably having an angle of winding 42 that is the negative of the angle of winding 42' of the preceding layer; FIG. 3 should not be taken to indicate that layers 38 and 38' are formed of strips of fabric, as such a construction would be contrary to the present invention and would produce undesirable seams at the edges of the fabric. It shall be understood that the seamless end-to-end winding of filament 24 over metal core 22 is an essential feature of the present invention, producing a shaft with symmetrical bending characteristics precisely because of the lack of any fabric seams. If desired, a covering 44, such as tape or paint, may be applied to the surface of the outer filament layer to improve the appearance thereof. Furthermore, if desired, longitudinal strands of boron could be placed periperally about metal core 22, in a manner well-known to those skilled in the art, to strengthen shaft 20.

In the preferred embodiment, the radial thickness of jacket 26 is chosen to vary from a typical thickness of 0.022 inches to a maximum at tip end 36 of either 0.030 inches for an "iron" shaft or 0.045 inches for a "metal-wood" shaft, thereby producing respective total combined outer diameters, of shaft 20 at tip end 36, of 0.370 and 0.335 inches for fitting into a standard-sized socket in the hosel portion 46 of golf club head 48, attached to tip end 36 of shaft 20 in the usual and well-known manner as shown in FIG. 7.

For many golfers, particularly arthritic golfers and many women, the embodiment of the present invention heretofore described will be sufficient. However, other golfers prefer golf club shafts with increased stiffness and resilience over those shafts typically designated in the industry as "A" (arthritic) or "L" (ladies), and instead choose shafts with the well-known designations "R" (regular), "S" (stiff), or "X" (extra strong), in increasing order of stiffness. These stiffer golf club shafts, because of the strength and power with which they are swung, are subjected to increased twisting forces acting upon the club head as it contacts a stationary golf ball. As the face 50 of club head 48 impacts a stationary golf ball 52 as shown in FIG. 8, shaft 20 is subjected to a torsional twist in the direction shown by arrow 54. It will be understood that, as shaft 20 twists upon impact, golf ball 52 will exert a twisting force thereupon varying from zero just prior to impact to some maximum value as the twisting forces resulting from the impact with golf ball 52 become in equilibrium with the restoring forces of shaft 20.

As the inventor, I have developed the following mathematical treatment to describe the forces acting upon a golf club shaft when a golf ball is driven down the fairway. The following assumptions are used in the equations:

| velocity of club head | = 80 miles per hour |
| --- | --- |
| | = 117 feet per second, |
| weight of club head | = 15 ounces |
| | = .9375 pounds, |
| dwell of driving force | = 0.02 seconds, | and, from the 1928 research of Lyman J. Briggs, reprinted in Robert K. Adair, *Physics of Baseball* (1990), at page 56, FIG. 4.4, a 1.6 ounce golf ball has a Coefficient of Restitution of 0.68 when impacted by a club head moving at 80 miles per hour. A graph of the Coefficient of Restitution of a golf ball versus impact velocity is reproduced for convenience as FIG. 4 of the drawings. The Coefficient of Restitution (COR) is well known to be the ratio of the velocity of a ball rebounding from the surf ace of a hard, immovable object to the incident velocity, and is equal to the square root of the proportion of the energy dissipated in the collision. Additionally, golf ball 52 is assumed to impact face 50 of club head 48 at a distance of approximately one inch from the axis of shaft 20, thereby resulting in a one inch lever arm moment.

Using these assumptions, $$I = 0.937 \times 117^2 = 12{,}800 \text{ pounds (force) seconds,}$$

$$I_K = I \times 0.68 = 8{,}720 \text{ pound-inches/second,}$$

$$F \text{ (force)} = 8{,}720 \times 0.02 \text{ seconds}$$
$$= 174.5 \text{ pound-seconds.}$$

Using the variables $\tau$, T, d, and $d_1$ respectively to represent the unit shearing stress (in pounds per square inch), twisting moment (in pound-inches), outer diameter (in inches), and inner diameter (in inches) of a hollow-round shaft, the unit shearing stress upon golf shaft 20 is known to be:

$$\tau = \frac{16\, T\, d}{\pi\, (d^4 - d_1^4)}$$

Eshbach, *Handbook of Engineering Fundamentals* Table 1, at 5-53 (1961). Substituting into this formula the typical values of
T = 175 pound-inches,
d = 0.374 inches, and d1 = 0.310 inches,
yields the result $$\tau = 3.23 \times 10^4 \text{ pounds per square inch.}$$

In order to reduce the "dead zone" through which club shaft 20 must twist before significant restoring forces act upon golf ball 52, a refinement of the present invention, hereinafter described, may be utilized for those golfers preferring a golf club shaft 20 with greater resistance to twisting.

Referring to FIGS. 5, 6, and 8, this refinement is accomplished by torsionally stressing metal core 22 by applying a torque thereto prior to and during the winding thereupon and bonding thereto of filament 24. This torque is applied by first twisting one end of core 22 relative to its other end prior to the winding of filament 24, then winding filament 24 to form jacket 26 and permanently bonding it to core 22 in a manner previously described, and then removing the applied torque. It should be understood that the torque acting upon core 22 should be in the same direction as the anticipated direction of twist 54 that will occur upon impact with golf ball 52, thereby effectively "prestressing" core 22 through a portion of its unstressed angle of twist 54. This "prestressing" of core 22 shall also be understood to produce golf shafts having increased resistance to twisting upon impact with golf ball 52, heretofore only accomplished by increasing the amount of expensive boron, carbon, fiberglass, or graphite fiber used to form shaft 20.

The preferred amount of prestressing torque to be applied to core 22 during manufacture is twice the advertised torque for the finished club shaft. A typical value of torque would be, for example, two foot-pounds for a club shaft having an advertised rated torque of one foot-pound.

One manner of supplying precisely such a torque is shown in FIGS. 5 and 6. In this preferred variation of the present invention, each end of core 22 will have a plurality of castellations 56 located at various angles therearound. Although FIGS. 5 and 6 only show the tip end 32 of core 22 for purposes of illustration, it shall be understood that the construction of butt end 30 is similar. A rod 58 having transverse holes 60 at either end is inserted longitudinally through bore 28 of core 22. Rod 58 is then given a torsional twist in the direction of and indicated by arrow 62. Pins, such as pin 64, are then inserted through castellations 56 in alignment with holes 60 at each end of rod 58, thereby securing rod 58, under tension, to either end of core 22. Upon removal of the twisting force from rod 58, the interacting forces between core 22 and rod 58 will reach equilibrium, with core 22 being stressed in an opposite direction from that shown by arrow 62 (i.e., in the direction shown by arrow 54) in a manner that will now be apparent to those skilled in the art.

It will be understood that rod 58 will remain secured to the ends of core 22 during the winding of filament 24 upon core 22 and the subsequent permanent bonding thereto, thereby applying a torque during these operations, after which rod 58 will be removed upon extraction of pins 64 from holes 60 in a manner that will now be apparent. It shall also be understood that, because some golfers address the ball from one side and swing their clubs in one direction whereas others address the ball from an opposite side and swing their clubs in the opposite direction, both "right-handed" and "left-handed" versions of the present invention, each created with opposite directions of torque during winding and bonding of filament 24, should be provided.

Research published by F. H. Agnew, *The American Golfer: Golf Clubs—Their Balance and Effectiveness* 17 (1911), indicates that, for properly balanced "feel" of a golf club, the center of gravity of the golf club shaft should be located so that the ratio of a first distance, from the center of the grip to the tip end, to a second distance, from the center of the grip to the center of gravity of the combined shaft and attached club head, is within five percent of the square root of 2.5 (i.e., approximately in the ratio of 1.58 to 1). The reason for this is that the club swings or vibrates as a pendulum, with the point of suspension being located approximately at the left wrist joint for right-handed players (or at the right wrist joint for left-handed players). Furthermore, the center of the grip may be considered as a hinge, about which the club swings.

Referring to FIGS. 7 and 8, the center of gravity 66 of golf club 68 (comprising shaft 20 with club head 48 attached to the tip end 36 thereof) is that point at which the entire weight or mass of club 68, as well as all forces acting upon club 68, appear to be concentrated, and may be found in the well-known manner by determining the point at which club 68 balances upon a fulcrum 70. The nearer that center of gravity 66 is to the golfer's hands, the lighter the club will appear during the golfer's swing. It is well-known to those skilled in the art that the center of gravity may be moved longitudinally along shaft 20 simply by permanently attaching, as by screwing, one or more weights 72 (or a single large weight) to club head 48. Furthermore, the normal grip center 73, i.e., that point at which the golfer's hands join when gripping the club, is, for correct golfing form and best results, about six inches from the butt end 34 of shaft 20. This "weighting" (or "swing-weighting") of club head 48 can therefore be used, in a manner that is now apparent, to adjust the location of the center of gravity 66 so that the ratio of a first distance 74, from grip center 73 to tip end 36, to a second distance 76, from grip center 73 to center of gravity 66 of the combined shaft and attached club head, is approximately equal to the square root of 2.5, in accord with the research of Agnew. In practice, it may not be possible with discrete weights 72 to precisely locate center of gravity 66 so that this ratio is observed as preferred, but an allowable tolerance within five percent of the desired ratio will still be considered to be within the scope of this invention.

A beam supported at one end and fixed at the other has a well-known maximum bending moment $M_x$ (in pound-inches) at any point x along the beam of $$M_x = \frac{Pb^2 x(2l + a)}{2l^3}.$$

where P is the force (in pounds) applied to the beam, l is the total length of the beam (in inches) from the supported end of the beam to the fixed end of the beam, b is the distance (in inches) from the point at which force P is applied to the fixed end of the beam, a is the distance (in inches) from the point at which force P is applied to the supported (other) end of the beam, and x is the distance from the supported end of the beam.

By analogy with the golf club of the present invention, in which point 70 is located so that the ratio of a first distance 74, from grip center 73 (i.e., approximately six inches from butt end 34) to tip end 36, to a second distance 76, from grip center 73 to center of gravity 70 of the combined shaft and attached club head, is approximately the square root of 2.5, the values for substitution into the previous equation are seen to be, for a forty-six inch shaft, $$l = 46 - 6 = 40 \text{ inches,}$$

$$P = 175 \text{ pounds,}$$

$$b = 40/\sqrt{2.5} = 25.3 \text{ inches,}$$

$$a = l - b = 14.7 \text{ inches, and}$$

$$x = a = 14.7 \text{ inches,}$$

yielding $$M_x = 1218 \text{ pound-inches.}$$

Furthermore, as disclosed in Braly, U.S. Pat. No. 4,070,022, issued Jan. 24, 1978, hereby fully incorporated by reference herein; Braly, U.S. Pat. No. 4,122,593, issued Oct. 31, 1978, hereby fully incorporated by reference herein; and Wright, U.S. Pat. No. 4,455,022, issued Jun. 19, 1984, hereby fully incorporated by reference herein, golfers prefer sets of clubs having matched sets of predetermined natural frequencies. In the manner of Braly, U.S. Pat. No. 4,070,022, golf club shafts 20 of the present invention may be secured by the butt end 34, fastened with a predetermined test weight at the tip end 36 thereof, then excited and the frequency of vibration measured, thereby determining the "natural frequency" of the shaft 20. In the manner of Braly, U.S. Pat. No. 4,122,593, and Wright, U.S. Pat. No. 4,455,022, tip and butt portions, 78 and 80, respectively adjacent tip end 36 and butt end 34, may be trimmed from an overlong blank universal shaft 20 to produce a desired shaft length and desired natural frequency of vibration. It will be understood that as the amount removed from the tip portion 78 increases, the natural frequency of the resulting shaft 20 increases. The total amount of material 78 and 80 removed from the overlong blank shaft 20 depends solely upon the length of the shaft desired, and the relative amounts removed from tip 36 and butt 34 depends solely upon the natural frequency of shaft 20 desired. In this manner, a single inventory of overlong blank universal shafts can function as a source of golf shafts of varying length and varying natural frequencies of vibration.

Although the present invention has been described and illustrated with respect to a preferred embodiment and a preferred use therefor, it is not to be so limited since modifications and changes can be made therein which are within the full intended scope of the invention.

I claim:

1. A composite seamless filament-wound golf club shaft, said shaft comprising:
   (a) a metal core; and
   (b) a filament spirally wound about the core to form a seamless jacket thereabout, said filament being permanently bonded to the core, said core being torsionally stressed by applying a torque thereto prior to and during the winding thereupon and bonding thereto of the filament.

2. The shaft as recited in claim 1 in which the core is a hollow steel tube and the filament is impregnated with an adhesive.

3. The shaft as recited in claim 1 in which said filament is selected from the group consisting of steel, fiberglass, graphite, and carbon.

4. The shaft as recited in claim 3 in which the shaft has a tip end having a club head attached thereto and further in which the shaft has a butt end remote from the tip end, said shaft having a grip portion adjacent said butt end, said grip portion having a certain point thereupon defined to be six inches from said butt end, and in which the ratio of a first distance, from said certain point to said tip end, to a second distance, from said certain point to the center of gravity of the combined shaft and attached club head, is within five percent of the square root of 2.5.

5. A composite seamless filament-wound golf club shaft, said shaft comprising:
   (a) a hollow steel tubular core; and
   (b) a filament spirally wound about the core to form a seamless jacket thereabout, said filament being impregnated with an adhesive and permanently bonded to the core, said filament further being selected from the group consisting of steel, fiberglass, graphite, and carbon,
in which the core is torsionally stressed by applying a torque thereto prior to and during the winding thereupon and bonding thereto of the filament.

6. The shaft as recited in claim 5 in which the shaft has a tip end having a club head attached thereto and further in which the shaft has a butt end remote from the tip end, said shaft having a grip portion adjacent said butt end, said grip portion having a certain point thereupon defined to be six inches from said butt end, and in which the ratio of a first distance, from said certain point to said tip end, to a second distance, from said certain point to the center of gravity of the combined shaft and attached club head, is within five percent of the square root of 2.5.

7. A method of manufacturing a golf club shaft having a tip end and an adjacent tip portion as well as a butt end and an adjacent butt portion, said method comprising the steps of:
   (a) spirally winding a filament about a metal core to form a seamless jacket thereabout;
   (b) permanently bonding the filament to the core; and
   (c) torsionally stressing the core by applying a torque thereto prior to and during the bonding of the filament to the core.

8. A method of manufacturing a golf club, said method comprising the steps of:
   (a) manufacturing a golf club shaft having a tip end and an adjacent tip portion as well as a butt end and an adjacent butt portion by spirally winding a filament about a metal core to form a seamless jacket thereabout and permanently bonding the filament to the core wherein the core is torsionally stressed by applying a torque thereto prior to and during the bonding of the filament to the core; then
   (b) measuring the actual natural frequency of the golf club shaft; then (c) determining relative amounts of shaft material to be removed from the tip and butt portions thereof; then (d) removing the relative amounts of shaft material so determined from both the tip and butt portions of the shaft to leave remaining tip and butt ends, the total amount of material removed from the shaft solely depending upon the resulting length of shaft desired, and the relative amounts removed from the tip and butt portions solely depending upon the natural frequency of the shaft desired; then (e) attaching a club head to the remaining tip end of the golf club shaft; then (f) weighting the club head so that the ratio of
 a first distance, from said remaining tip end to a point six inches from said remaining butt end, to
 a second distance, from the center of gravity of the combined shaft and attached club head to said point six inches from said remaining butt end,
is within five percent of the square root of 2.5.

* * * * *